Nov. 3, 1931. H. A. CORBETT 1,830,641
TWINE BALLING APPARATUS AND METHOD
Filed Oct. 28, 1927 8 Sheets-Sheet 1

Fig. 1.

INVENTOR
Herbert A. Corbett
BY
Emery Booth, Janney & Varney
ATTORNEYS

Nov. 3, 1931.  H. A. CORBETT  1,830,641
TWINE BALLING APPARATUS AND METHOD
Filed Oct. 28, 1927  8 Sheets-Sheet 4

Nov. 3, 1931.  H. A. CORBETT  1,830,641

TWINE BALLING APPARATUS AND METHOD

Filed Oct. 28, 1927  8 Sheets—Sheet 5

INVENTOR
Herbert A. Corbett
BY
ATTORNEYS

Nov. 3, 1931. H. A. CORBETT 1,830,641
TWINE BALLING APPARATUS AND METHOD
Filed Oct. 28, 1927   8 Sheets-Sheet 7

Nov. 3, 1931. H. A. CORBETT 1,830,641
TWINE BALLING APPARATUS AND METHOD
Filed Oct. 28, 1927 8 Sheets-Sheet 8

INVENTOR
Herbert A. Corbett
BY
Emery, Booth, Janney & Varney
ATTORNEYS

Patented Nov. 3, 1931

1,830,641

UNITED STATES PATENT OFFICE

HERBERT A. CORBETT, OF AUBURN, NEW YORK, ASSIGNOR TO COLUMBIAN ROPE COMPANY, OF AUBURN, NEW YORK, A CORPORATION OF NEW YORK

TWINE BALLING APPARATUS AND METHOD

Application filed October 28, 1927. Serial No. 229,404.

This invention relates to twine balling method and apparatus and particularly to devices included in such apparatus for applying bands to the outer surface of balls of twine.

In the manufacture of twine balls according to the most common present practice a certain amount of twine is pulled out from the finishing end and wrapped several times about the circumference of the ball across the turns in the cover layer of twine so as to form a retaining band for the same, after which the end of the twine is pushed beneath the band thus formed to prevent unraveling. This practice, besides requiring considerable skill on the part of an operator for its execution, also entails great waste of twine and of the operator's time. Moreover, when the ultimate consumer of the twine balled in this manner comes to use it he most frequently begins using the outer end, removing the band and allowing the twine to unravel or slip off in layers and waste. The latter cause of waste is encountered particularly when the twine has a smooth or glazed surface, not only on account of the smooth finish in itself but also on account of the fact that glazed twine as usually manufactured contains considerable moisture at the time it is wound into balls and hence shrinks in the ball allowing the layers to become loose. To a certain extent these consumption losses are eliminated when the twine is pulled out from the inner end but this also entails waste through the falling in of the outer layer after the inner supporting layers have been removed.

According to the present invention the waste of time and material entailed in manufacturing and the waste incident to consumption are effectively reduced or entirely eliminated by the application of a band of paper or other material to the outer surface of the completed ball. The band may be reinforced to prevent tearing, if of paper, and preferably is provided with an adhesive surface next the ball so that each individual strand of the cover layer will be securely held in place relative to adjacent strands and also held from falling in toward the center of the ball as the lower layers are removed. The band thus serves to strengthen or lend rigidity to the outer layer. When such a band is employed it provides a convenient surface for printed matter such as directions or advertisements and trade marks of the manufacturer whereas it has heretofore been difficult, if not impossible, for a manufacturer to properly identify his product in the hands of the individual consumer using less than carton lots.

With the above considerations in view it is the general object of the present invention to provide apparatus for the application of such bands and desirably also to provide apparatus for the fabrication of the bands.

For the purpose of furnishing a more complete understanding of the invention the same is shown embodied in an existing form of machine for winding the balls though it is to be understood that it is not limited to use with the particular winding machine but may be employed in connection with many other types of machines and further that the band applying apparatus itself may have various embodiments other than that herein illustrated and described.

The nature of the invention and further objects will be apparent from the following description when taken in connection with the accompanying drawings forming a part of this specification and in which:—

Fig. 4 is an enlarged vertical section taken on line 4—4 of Fig. 3;

Fig. 5 is an enlarged sectional view of a detail shown most clearly in its relation to other parts in Fig. 2;

Fig. 5A is a sectional view taken on the line 5A—5A of Fig. 5;

Fig. 6 is a front elevation and Fig. 7 a side elevation of a band guide;

In the drawings the letter A denotes a supporting frame comprising vertical members 20, cross members 21, and a top plate 22. Spaced pedestals 23, secured to the rear top surface of the plate 22 by studs 24, are provided with bearings held by retaining caps 25 for the main driving shaft 26. The shaft may be driven through a pulley 27 by a belt 28 or the equivalent.

A bracket 30 is secured to the plate 22 by any suitable means and this bracket is provided with a lower laterally extending foot 31 and an upper laterally extending arm 32 providing support for an oscillating frame 33 pivoted to the foot 31 at 34 and to the arm 32 at 35.

The oscillating frame 33 is provided with spaced vertical members 36 and 37 furnishing bearings for a mandrel or spindle 38 upon which the balls of twine are formed, and for an intermediate shaft 39. The mandrel shaft 38 carries a gear 40 meshing with a gear 41 on the shaft 39. A bevel gear 42 is fixed to the shaft 39 and is driven by a bevel gear 43 secured upon a vertically disposed shaft 44 mounted in the frame 33 and passing through a suitable aperture in the table 22. The shaft 44 oscillates in the aperture about the pivot points 34 and 35 of the frame 33 and a gear 46 on the shaft 44 is in mesh with and driven by a gear 47 on a vertical shaft 48, the axis of the latter shaft being in line with the axis of the pivots 34 and 35. The gear 46, due to this arrangement, is constantly driven by the gear 47 although it oscillates in an orbit about the gear 47.

The shaft 48 carries bevel gears 51 and 52 and is slidable in a vertical direction in suitable bearings supported by the frame A in order to bring the gear 51 in mesh with a bevel gear 53 or alternately to bring the gear 52 in mesh with a bevel gear 54 in order that the shaft 48 may be driven at selected speeds. The gear 53 is carried by a horizontal shaft 55 which carries at its other end a bevel gear 56 in mesh with a bevel gear 57 on a drive shaft 58. The bevel gear 54 is carried by a journal 60 and is rigidly secured to a gear 61 meshing with a gear 62 on a horizontal shaft 63. The shaft 63 is provided with a bevel gear 64 driven by bevel gear 65 on the shaft 58. The shafts 55 and 63 are supported by bearing brackets 66 and 67 secured to the frame A. The lower end of shaft 48 is carried in a pintel bearing 70 supported through a pin 72 by foot treadle lever 71 pivoted upon a cross member 73 by a rod 73a. The pin 72 works in a slot in the lever 71 in order to keep the pintle bearing 70 directly in line with the shaft 48 in all positions. Any convenient means may be provided for holding the lever 71 and the bearing 70 in the upper or lower adjusted positions. For example, a block 74 of proper thickness may be placed upon the floor beneath the pintle-carrying end of the lever 71 when adjusted to hold the selected gears in mesh.

The shaft 58 carries a friction plate or disc 75 at its upper end and is driven by a friction pinion 76 splined to the shaft 26 so as to be slidable thereon into various adjusted positions for driving the shaft 58 at different desired speeds. For the purpose of shifting the friction pinion 76 to various positions along the shaft 26 it is provided with a grooved collar 77 engaged by fingers 78 of an arm 79 carried upon a post 80 fixed to the table 22. The arm 79 may be secured in various adjusted positions on the post 80 by means of a set screw 81 passing through a hub 82 provided on the arm and into engagement with the post.

In order that the friction plate 75 may at all times be held in firm engagement with the friction pinion 76, the shaft 58 is slidable in its bearing on the frame A and is biased upward by a lever 85 pivoted to a cross member 21 of the frame A by a pin 86. The longer arm of the lever 85 carries a weight 87 and the shorter arm carries a pintle bearing 88 for a shaft 58 similar to the pintel bearing 70 described for shaft 48.

A flyer 90 is carried by a shaft 91 rotatably mounted in the bracket 30 and is driven from the shaft 26 by any suitable means as, for example, by a sprocket chain 92 operating upon a sprocket wheel 93 on the shaft 26 and a sprocket wheel 94 on the shaft 91. The flyer 90 comprises a pair of oppositely extending arms 95, 95 secured to the shaft 91, a twine-laying member 96 and a counterweight member 97. The counterweight 97 may be a smoothly rounded member adapted to serve as a handle for adjusting the position of the flyer with relation to the swung position of the mandrel frame 33 for a purpose which will later be made apparent.

Figures 12, 13, 14:
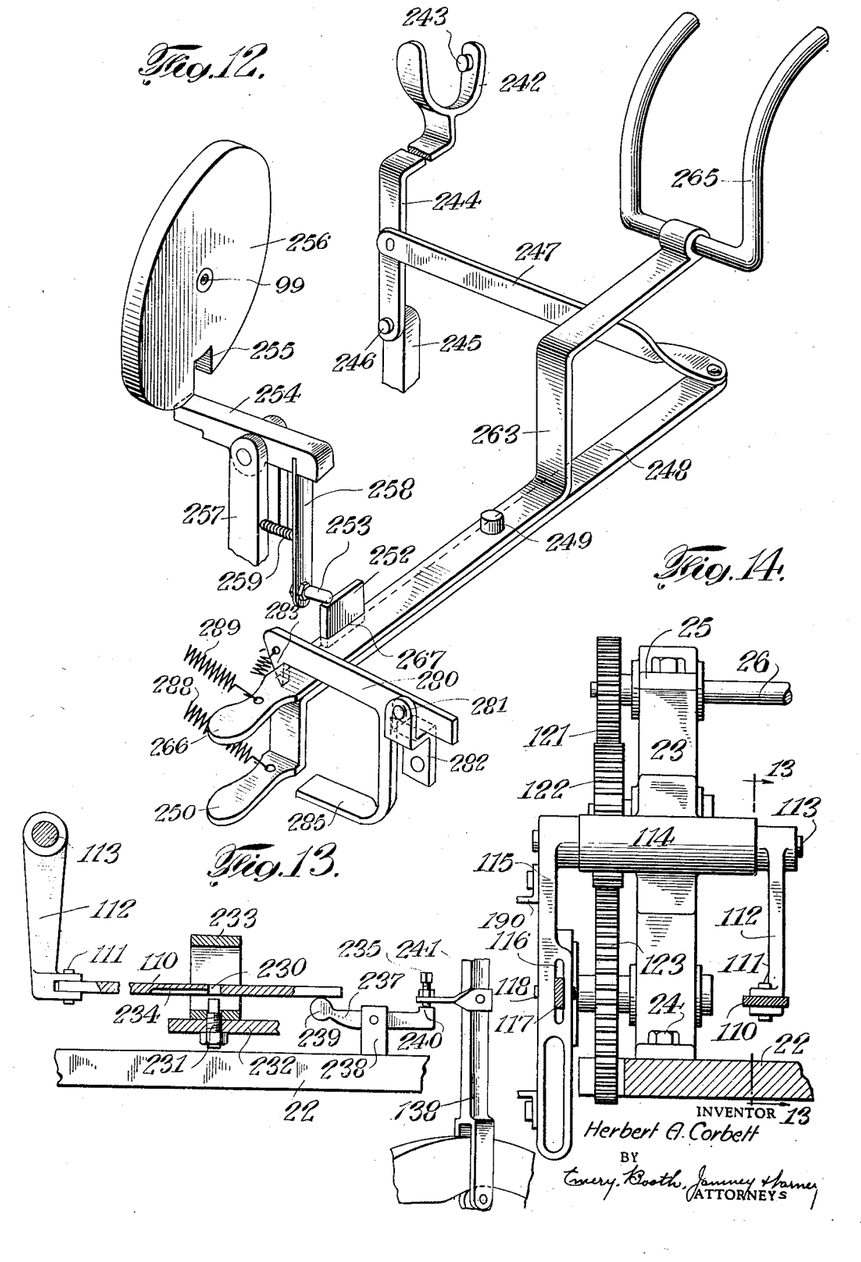
Fig. 12 is an enlarged perspective view of automatic and manual control devices.
Fig. 13 is an enlarged vertical section on line 13—13 of Fig. 3.
Fig. 14 is an enlarged vertical section on line 14—14 of Fig. 3.

The flyer shaft 91 is provided with a central axial bore 99 as most clearly shown in Fig. 12 for permitting the twine strand 100 to pass therethrough from feeding rolls or spools 102 to the twine laying member 96 of the flyer. The feeding spools 102 are carried upon brackets 103 secured to the frame A and tension is applied to the feeding rolls by any preferred means as, for example, a gravity weighted brake shoe 104 bearing upon a flange of the spools 102 for preventing too rapid feeding of the twine. The spindles of the spools 102 may be removably held upon blocks 105 secured to the brackets 103 by hooks 107 pressed against the spindles of the spool by springs 108.

The mandrel frame 33 may be oscillated in any desired manner but, as shown, the mechanism provided for this purpose includes a reciprocating bar 110 pivotally connected by a pin 111 to a rocking lever 112 keyed to an oscillating shaft 113. The shaft 113 is mounted in a bearing 114 carried upon the pedestal 23 and, at the end opposite the arm 112 carries another rocking lever 115. This latter lever is provided with a slot 116 to accommodate an eccentric rod 117 secured therein by a pin 118. The eccentric rod 117 is operated by an eccentric 120 driven from shaft 26 by gears 121, 122 and 123, the gear 121 being fast on the shaft 26, the gear 123 being fast on the eccentric shaft and the gear 122 being loosely mounted between the gears 121 and 123 on a journal 124 secured to the pedestal 23.

The parts thus far described are sufficient for the ordinary winding of a ball of twine on the mandrel 38. It will be evident that when the shaft 26 is driven through the belt 28 it will turn the friction pinion 76 to rotate the friction plate 75 and the shaft 58 which will drive shaft 48 either through shaft 55 or shaft 63, and through the train of gears described, will cause rotation of the mandrel or spindle 38 upon which the ball of twine is wound. The frame 33 carrying the mandrel 38 will, at the same time, be oscillated about the pivot points 34 and 35 by the bar 110 through the operation of the eccentric 120. While the mandrel 38 is thus rotated on its own axis and oscillated in the frame 33, the flyer 90 is turned rapidly to lay the twine in a ball upon the mandrel.

The machine described is to be considered as exemplary only and it is to be understood that machines of a different character and mode of operation may be used in connection with the band-applying mechanism now to be described. Also it will be understood that the particular band-applying mechanism hereinafter described has been made to conform more or less, in its physical embodiment, to the twine winding machine chosen for illustration in connection therewith and that the band-applying mechanism would assume different specific embodiments when adapted to other types of machines.

As shown, a frame 130 is secured upon the table 22 and supports a box 131 for tape feeding mechanism in such position that the forward end of the box from which the tape 150 issues will stand closely adjacent to the ball winding space of the spindle 38 so that the tape may be conveniently applied to the surface of the finished or partly finished ball indicated in the drawings by the letter B.

The details of the tape feeding box are most clearly shown in Figs. 4 to 10 inclusive. Here it will be seen that the box comprises a bottom piece 132 curved upwardly at its outer end 132a, and side plates 133 and 134. Two rolls 136 and 137 are journaled in the side plates 133 and 134. These rolls are driven by a vertically moving rack bar 138 extending along one side 134 of the box. The roll 136 is driven directly by the rack bar 138 through rack teeth 139 operating upon the pinion 140 having ratchet drive connection with the spindle of the roll.

Figures 4, 5, 5A, 6, 7:
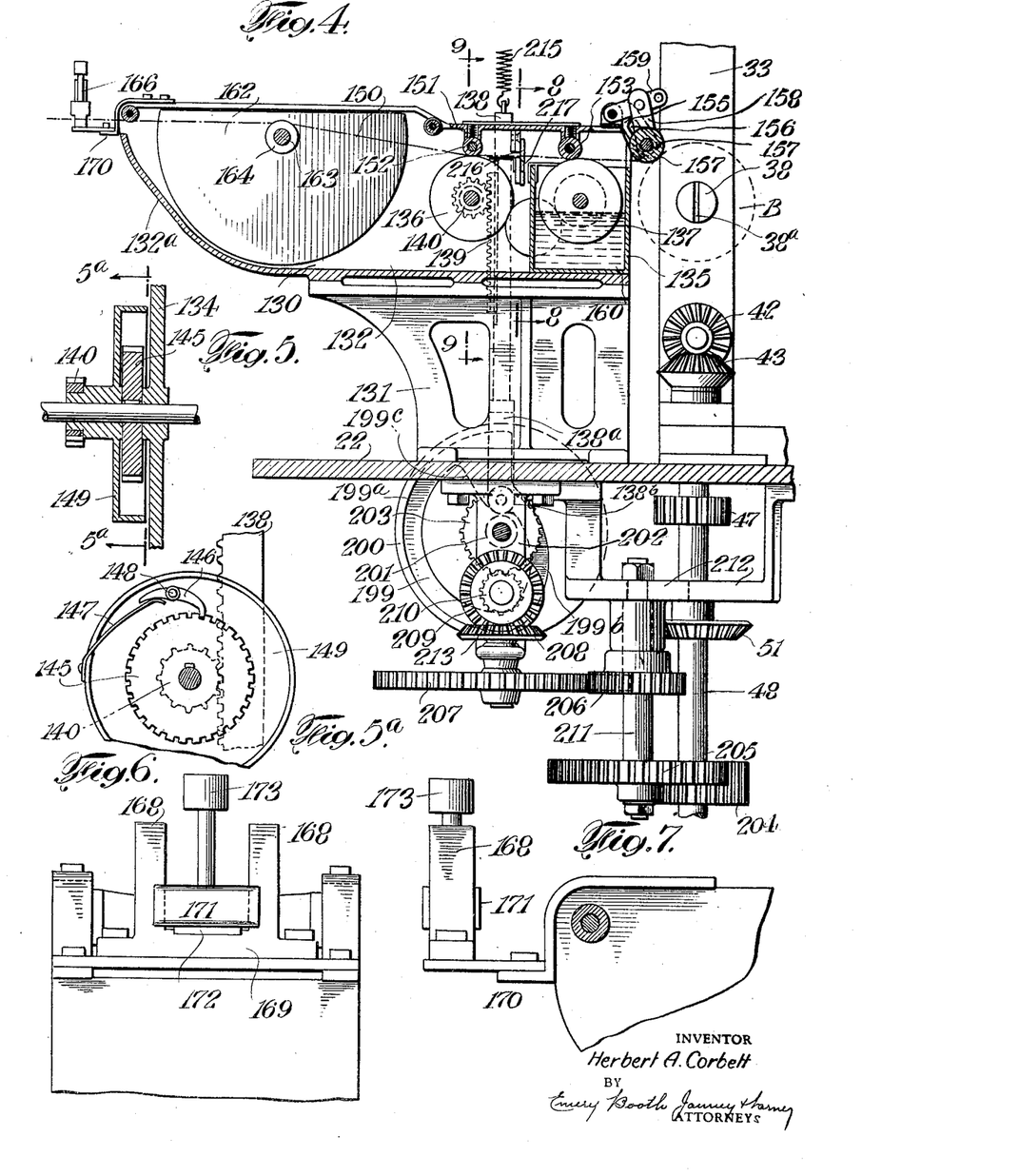
Figure 8:
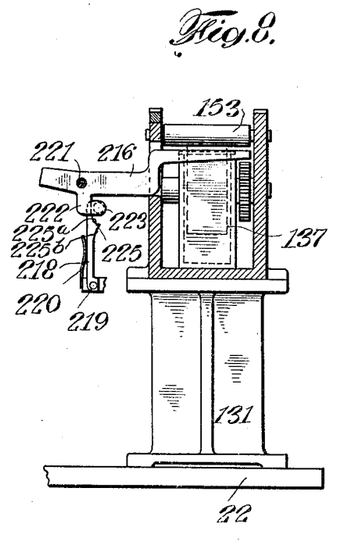
Fig. 8 is a vertical section on the line 8—8 of Fig. 4.
Figure 9:
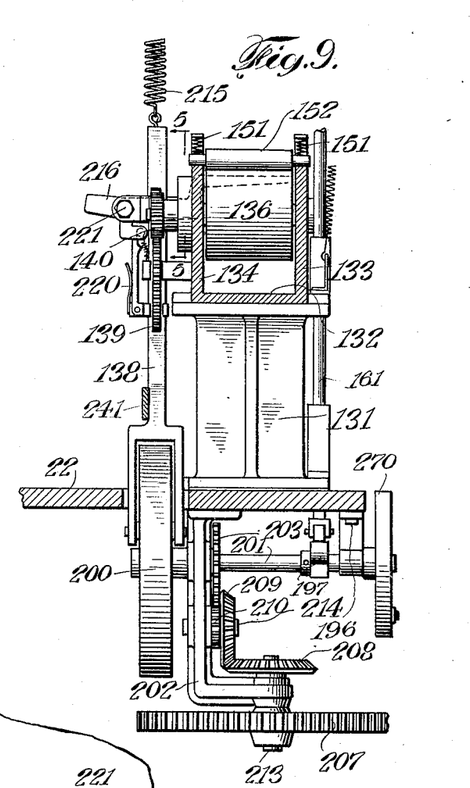
Fig. 9 is a vertical section on the line 9—9 of Fig. 4.
Figure 10:
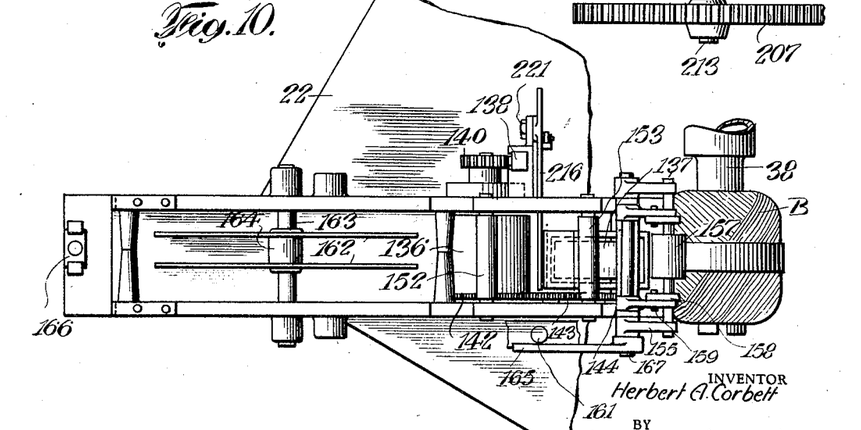
Fig. 10 is a fragmentary plan view of parts shown in Fig. 3.

A second gear 142 is secured to the shaft of the roll 136 and this gear meshes with an intermediate gear 143 to drive a gear 144 on the shaft of the roll 137 to cause said latter roll to be driven when the roll 136 is driven and in the same direction. As shown in Figs. 5 and 5A the pinion 140 is carried upon the hub of a disc 149 loosely mounted on the shaft of the roll 136 and the shaft may be provided with a ratchet wheel 145. A pawl 146 is pressed toward the ratchet wheel by a spring 147 and drives the roll through its pivot pin 148 which is secured to the disc 149. By this means the rolls are always caused to rotate in feeding direction by downward movement of the rack bar as indicated by the arrow in Fig. 5A.

Journaled between the members 133, 134 in vertical slots are rolls 152, 153 frictionally engaging the rolls 136, 137 respectively. Springs 151 cause these rolls 152 and 153 to press firmly against their companion rolls so that the tape 150 will be positively gripped between them at all times. The front ends of the plates 133, 134 carry spaced bearing brackets 155 provided with slots 156 for the purpose of retaining the stud journals of a roll 157 adapted to engage the surface of the twine ball B when the same has reached approximately its completed size. Rods 158 pivotally connected to the roll journals and to rocking levers 159 press the roll 157 upon the ball at the proper time through the action of a push rod 161 connected through a heavy spring 174 to a lever 165 fast upon the same shaft 167 as that to which the levers 159 are keyed. A light spring 141 attached to lever 165 normally holds the roll 157 away from the ball. The push rod 161 is operated by a cam to be described later.

A small container 160 is provided for supplying a fluid to dampen the roll 137. In case the tape arrives at the roll 137 with adhesive material already affixed thereon, the fluid in the container 135 may be water or like dampening fluid but, if desired, an adhesive fluid may be carried in the container and be applied directly to the tape by the roll 137.

Toward the rear end of the box 131 and interiorly of the side plates 133 and 134 a pair of spaced guides 162 are mounted on a rod 163 arranged between the side plates. The tape 150 is adapted to pass between these guide plates 162 and, if desired, a roll 164 may be provided upon the rod 163 for the purpose of preventing friction of the tape as it passes thereover. A guide 166 is provided at the outer end of the box 131 for aligning the tape as it arrives in feeding position with relation to the box. This guide is shown in detail in Figs. 6 and 7 and comprises spaced roller journal guides 168 integral with a base 169 and a slide 171 carrying a roller 172 adapted to be pressed upon the tape by a weight 173. The base 169 may be secured upon a bracket 170 attached to the box.

Although the tape which is used on the twine balls B may be of any desired type which will resist transverse tearing I prefer to use a paper tape which is reinforced along its length either by being stitched, by having reinforcing strands of twine or cord secured thereto, or by some other approved method. Also, while the tape may be formed and supplied ready for use I prefer to fabricate the tape in the same machine which applies it and for this purpose I have shown suitable mechanism in the drawings.

This mechanism includes a tape supply roll 175 carried upon a stud 176 upon the side of the frame A, reinforcing cord supply spools 177, 177 rotatably mounted upon a stud 178 secured to a bracket 179 at the rear of the frame A and means to apply the cord to the tape. The tape and cord are fed to a roll 180 secured in bearing brackets 181 on the side of the frame A where the cord is pressed upon the tape by a roll 182 biased in any suitable manner toward the roll 180. As the cord approaches the point where it contacts the tape it is dampened by any suitable device such as indicated at 183 and thereafter passes through guides 184 and 185 situated more closely adjacent the roll 180. In the form of tape used according to the present description a strand or cord is applied to each lateral edge of the tape so that the guides 184 and 185 will be arranged to lay the cord in two strands along the edges of the tape. It will be understood, however, that the reinforcing cord may be applied in a single strand to the center of the tape or to either edge alone or that more than two strands of cord may be used without the necessity of making any considerable changes in the mechanism disclosed.

A ratchet wheel 186 is secured to the roll 180 and this ratchet wheel is driven by a pawl 187 pivoted upon a rocking arm 188 operated by a rod 189 from the rocking lever 115 already described. For the purpose of changing the rate at which the tape is fed to the mechanism the connection between the rod 189 and the lever 115 is preferably made through a bracket 190 provided with a slot 191 along which the connecting pivot pin 192 may be adjusted. A dog 194 pivoted adjacent the ratchet wheel 186 and pressed thereagainst by a spring 195 may be employed to hold the roll 180 against reverse movement. The tape 150 will be understood to have a gummed substance on its surface as it arrives at the roll 180 and further that the gummed surface of the tape is positioned uppermost where it will contact with the strands of cord which have been dampened as set forth. The dampened cords will be pressed to the gummed surface of the tape by the roll 182 so that they will be firmly affixed thereto as they arrive at the guide 166 to be supplied to the balls B. Should an ungummed tape be used, the reinforcing cords themselves may carry an adhesive coating and be applied in the manner described without change in the mechanism provided.

The tape 150 may be applied to the surface of the ball B after the latter has been completely wound but preferably the end of the tape is started upon the ball before the last part of end surface layer of twine has been laid thereon. This not only provides that the tape will be placed on the ball in such a manner that it cannot easily be removed when the article is marketed but also provides for gripping the end of the tape upon the ball so that it may be carried therearound after the ball is completed by turning of the mandrel upon which the ball is wound. The tape is fed toward the ball by the rolls 136 and 137 through the operation of the rack bar 138 as has already been explained.

Suitable mechanism according to this invention will be provided for operating the rack bar 138 in timed relation with the operation of the ball winding mechanism, which latter mechanism will be understood to include the mandrel rotating mechanism, the mandrel frame oscillating mechanism and the flyer operating mechanism. For this purpose a double faced disc cam 200 is rotated adjacent the lower end of the rack bar 138, the latter being provided with a bifurcated portion 138a riding over the edge of the cam 200 and having inturned fingers or cam followers 138b engaging the identical cam grooves 199 on opposite faces of the cam disc 200.

Figure 11:
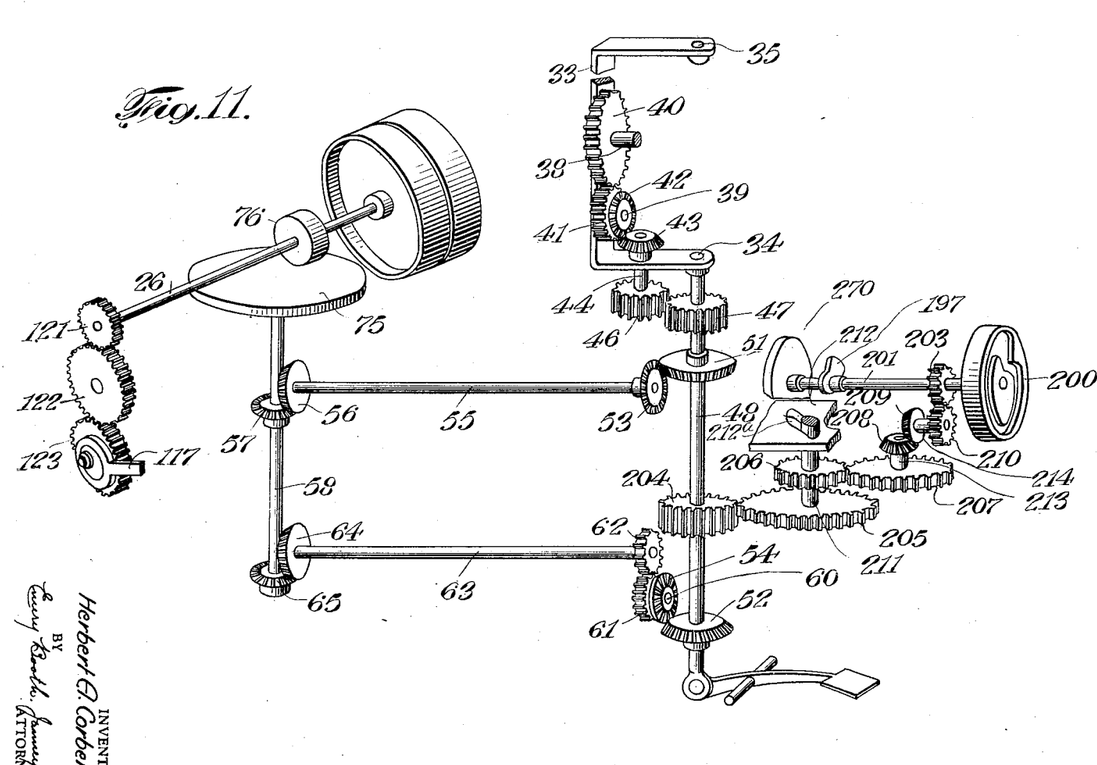
Fig. 11 is a gearing diagram rearranged slightly for clarity of the view.

A shaft 201 for the cam 200 is rotatably mounted in brackets 196 and 202 suspended beneath the frame plate 22. A gear 203 is fixed to the cam shaft 200 and this gear is driven from a gear 204 on the shaft 48 through a train of gears 205, 206, 207, 208, 209 and 210, suitable shaft and shaft bearing brackets being provided for this connecting train. As illustrated, the gears 205 and 206 are carried by a vertical stub shaft 211 secured in a depending bracket 212 fastened beneath the frame plate 22; the gears 207 and 208 are carried by shaft 213 mounted in an L-extension of the bracket 202; while the gears 209 and 210 are carried by a horizontal stub shaft 214 mounted in the vertical por ion of the bracket 202 below the shaft 201. The arrangement of this train of gears for driving the cam disc 200 from the vertically movable shaft 48 is clearly shown in the gearing diagram, Fig. 11. This figure also shows the arrangement of gearing between the shaft 48 and the mandrel 38 carried in the oscillating frame 33. Shaft 211 is adjustable in a slot 212a in bracket 212 concentric with shaft 48 to change gear 206 and thus change the speed of cam shaft 201 for different sizes or shapes of balls.

The grooves 199 of the cam disc 200 are formed with a concentric portion 199a, an inwardly directed portion 199b and an approximately radial portion 199c. The concentric portion is arranged near the outer periphery of the cam and is intended to allow the rack bar to be positioned at the upper end of its stroke, to which position it is biased by a spring 215, for the greater portion of the time that the ball is being wound, it being understood of course that the cam 200 rotates continuously but at a relatively slow rate of speed. When the ball has been almost completely finished so that only a few turns of the surface layer of twine remain to be applied, the cam fingers 138b of the rack bar 138 will enter the inwardly directed portion 199b of the cam groove to move the rack bar down and supply tape to the ball. When a sufficient amount has been supplied the fingers 138b will enter the radial portion 199c of the cam groove and allow the rack bar to move upward suddenly under the influence of the spring 215. This will cause the rack bar to operate one blade 216 of cutting shears to sever the tape 150 by engagement with the fixed blade 217 of the shears.

The mechanism through which the rack bar moves the blade 216 comprises a member 218 pivoted upon the rack bar 138 by a pin 219 and biased by a spring 220. The blade 216 is pivoted upon a stationary part of the machine by a pin 221. Below the pivot 221 and nearer the cutting edge, the blade 216 is provided with a depending portion 222 carrying a lateral stud 223. The member 218 has a cam portion 225 on that side which is adapted to engage the stud 223. The upper face 225a of the cam 225 is abrupt while the lower surface 225b has a more gentle slope. From this construction it will be seen that when the rack bar moves down slowly under the influence of the disc cam the gently inclined portion 225b of the cam 225 will press against the spring 220 and ride over the stud 223 without causing movement of the blade 216 but, when the rack bar moves upward suddenly under the influence of the spring 215, the abrupt face 225a of the cam 225 will strike the stud 223 a sharp blow and force the cutting edge of the blade 216 upward to sever the tape. The cam surface 225a is not sufficiently abrupt, however, to cause the same to lock upon the stud 223 but allows it to move outwardly to permit the member 218 to pass by the stud 223 after the blade 216 has been given its initial blow.

Shaft 201 also carries a cam 197 for operating the push rod 161 for pressing roll 157 upon the ball in timed relation with the operation of the other parts of the machine.

According to this invention means is provided for stopping the oscillation of the frame 33 as the tape is fed to the surface of the twine ball in order that the tape may be disposed in a straight path about the mid-circumference or equator of the ball. Any desired mechanism may be employed for this purpose but preferably the mechanism which I employ is as follows. The bar 110 employed for oscillating the frame 33 is provided along its length with an aperture 230 adapted to pass over the end of a stud 231 secured in an extension 232 made fast to the frame 33. A box guide 233 is secured to extension 232 by the stud 231 for guiding the bar 110 into position for the aperture to engage the stud 231. Preferably also a groove 234 is provided on the lower side of the bar 110 leading to the aperture 230 for guiding the stud into the aperture. The bar 110 is made sufficiently flexible to allow it to be raised above the stud 230 for disengaging the same to stop movement of the frame 33 therefrom. In lieu of making the bar flexible for raising, an alternative arrangement readily understood without further illustration would be to provide the bar with an additional horizontally disposed pivot adjacent its connection to the rocking lever 112. A spring 236 or an equivalent device is employed to bring the frame 33 to rest at the proper position with respect to the tape feeding rolls to place the surface of the ball B squarely in front of the issuing tape. An adjustable stop pin 229 (Fig. 3) may be employed to limit the movement of the frame under the action of spring 236 if desired.

The means for raising the bar 110 from the stud 231 comprises a lever 237 pivoted upon supports 238 attached to the plate 22. The lever 237 at one side of the pivot is provided with a rounded end or knob 239 adapted to engage the bar 110 on its lower surface to raise it and, at its other end, the lever 237 is provided with a projection 240 on its upper surface adapted to be engaged by an adjustable locking screw 235 provided on a rigid bar 241 securely attached to the rack bar 138. When the rack bar is at the upper end of its travel the member 241 will be positioned some distance above the end 240 of the lever 237. The upper position of the member 241 corresponds to that at which the end of the tape coincides with the shearing blades and a lowered position of the member 241 where it is effective to stop the oscillation of the frame 33 by contact with the lever 237 corresponds to the position of the tape as it first reaches the surface of the ball. Thus the oscillation of the frame will be stopped as soon as the tape reaches the surface of the ball. Any further movement of the rack bar 138 downward after it engages the lever 237 will only cause an additional raising of the bar 110 within the guide box 233, the parts being made and arranged to have sufficient movement for this purpose.

The rotation of the flyer will not be discontinued as soon as the tape has been started upon the surface of the ball but will be allowed to continue in order that a number of turns of the surface cover of twine may be laid over the forward end of the tape fed to the ball as set out above.

When the desired number of turns of twine have thus been wound upon the ball over the tape, the flyer is stopped while the mandrel 38 continues to turn to carry the tape completely around the ball and sufficiently far to allow the tape to be attached upon itself. Any suitable means may be employed to stop the rotation of the flyer but the mechanism which I prefer to employ is as follows:

The sprocket wheel 93 is loosely mounted on the shaft 26 and a clutch 227 is splined to the shaft 26 so as to be slidable thereon and rotatable therewith at all times and this clutch is adapted to be brought into engagement with the sprocket wheel 93 to cause the same to turn with the shaft 26 or to be moved away from the wheel 93 in order that the latter may turn freely on the shaft 26. A groove 228 is formed in the clutch 227 and a yoke 242 provided with inturned fingers 243 which ride in the groove 228 is adapted to cause sliding movement of the clutch member 227. The yoke is carried by a lever 244 pivoted to a projection 245 fast on the frame A by a pin 246 at the lower end of the lever. A link 247 operatively connects the lever 244 at a point above the pin 246 to a lever 248 pivoted to a bracket 103 by a pin 249. The lever 248 is provided with a handle 250 at its outer end and adjacent the front of the machine for manual operation.

After the flyer has been disengaged from the drive shaft it would continue to rotate through the inertia of the parts and it is, therefore, desirable to provide means for stopping the same as soon as it is disconnected from the drive shaft. Any suitable means may be employed for this purpose but preferably the lever 248 is provided with an upstanding projection 252 adapted to engage a pin 253 to move the end of a detent lever 254 into a notch 255 in the periphery of a disc 256 made fast on the flyer shaft 91. The detent lever is pivoted between upstanding members 257 secured to the plate 22, and an arm 258 carrying pin 253 through which the detent lever 254 is actuated, is made flexible in order that the detent may be pressed against the smooth peripheral surface of the disc 256 until it springs into the notch 255 thereon. A coil spring 259 normally serves to press against the inner face of the flexible arm to hold the detent out of engagement with the disk 256.

After the ball of twine has been completely wound and the tape applied and secured upon its outer surface, it is necessary to stop the operation of the machine entirely in order that the ball may be removed and a new one started. For this purpose I have provided an idler pulley 260 on the shaft 26 to which the belt 28 may be shifted. A belt shift lever 263 may be employed for the purpose of moving the belt between the idler pulley 260 and the drive pulley 27, the same being equipped with a belt fork 265 and being pivoted upon the same pin 249 as that to which the lever 248 is pivoted. The front end of the lever 263 is provided with a handle 266 for manual operation. Between the pin 249 and the handle 266 the lever 263 coincides in normal or operating position with the lever 248 so that a notch 267 in the lever 263 rests against the side of the projecting member 252 on the lever 248. By this connection through the projecting member 252 the belt shift lever will be moved into operating position when the lever 248 is moved into operating position but the lever 248 may be moved into inoperative position to disengage the clutch of the flyer without shifting the lever 263 to throw the drive belt to the idler. The mandrel is thus allowed to continue in operation after the flyer has been stopped but will be set into operation at the commencement of the winding of a new ball simultaneously with the flyer.

Preferably automatic means is provided for stopping the flyer and for shifting the belt to the idler pulley in timed relation with the operation of the machine. As shown particularly in Figs. 1, 2, 3, 9 and 12, the mechanism provided for this purpose comprises a cam disc 270 fast on the cam shaft 201 provided with pins 271 and 272 on its face for operating a lever 273 pivoted upon a bracket 274 fast to the frame of the machine by a pin 275. The pin 271 is arranged nearer the center of the disc 270 than pin 272 and also in advance thereof so as to operate upon the lever 273 ahead of the pin 272. Pin 272 being nearer the periphery of the disc than pin 271 will cause further movement of the lever beyond the pivot to which it has been carried by pin 271. The pin 272 may be adjustably carried in a slot 276 in the disc 270 to regulate the time at which it will engage the lever. A latch 280 is pivotally mounted upon a pin 281 in a member 282 fast on a bracket 103 in such position that a hook 283 will engage and hold both the clutch lever 248 and the belt shift lever 263. The latch 280 is provided with an integral L-shaped arm 285 adapted to be engaged by an adjustable locking screw 277 carried in the outer end of the cam operated lever 273. When pin 271 engages the lever 273 it will cause the hook 283 on latch 280 to raise sufficiently to release the lower or clutch lever 248 while retaining the upper or belt shift lever. Both levers 248 and 263 are provided with springs 288, 289 respectively to cause them to move over when released by the latch.

The operation of the apparatus in its simple form for winding a ball of twine upon the mandrel 38 has already been described and the related operation of parts for applying tape to the surface of the completed ball of twine will be clear from the preceding description and statement of the function of the various auxiliary devices. A summary of the operation of these auxiliary devices will now be given, however, for the purpose of making the operation more readily apparent.

Figure 1:
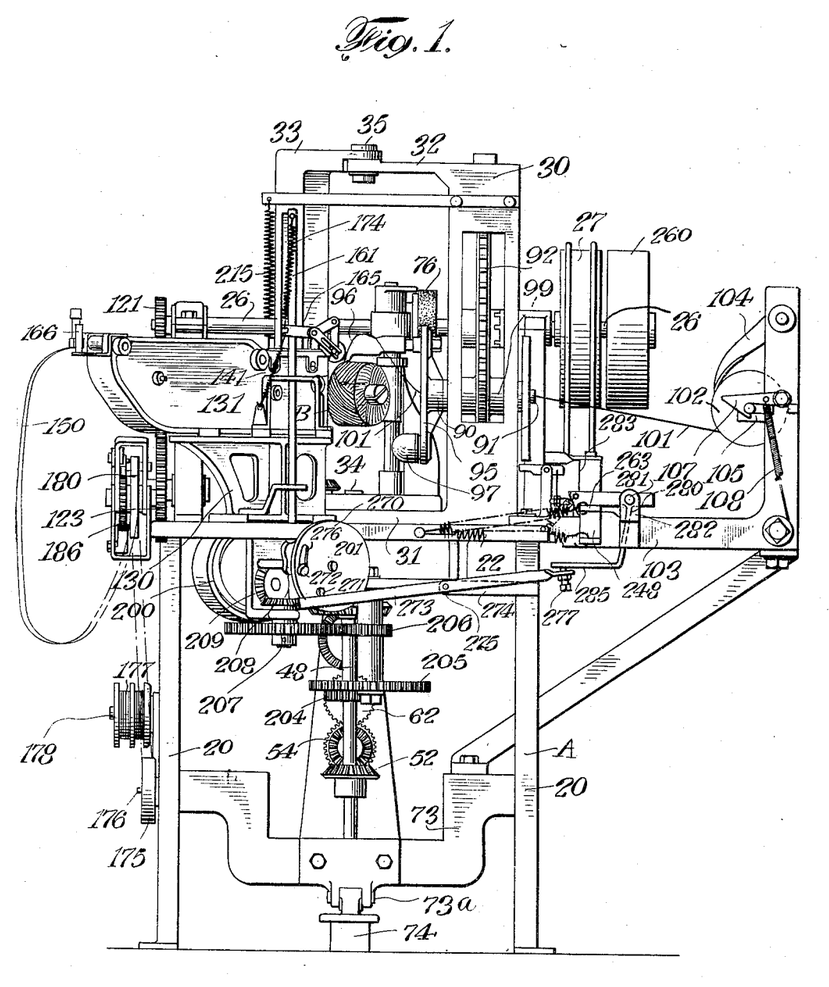
Fig. 1 is a front elevational view of apparatus embodying this invention.
Figure 2:
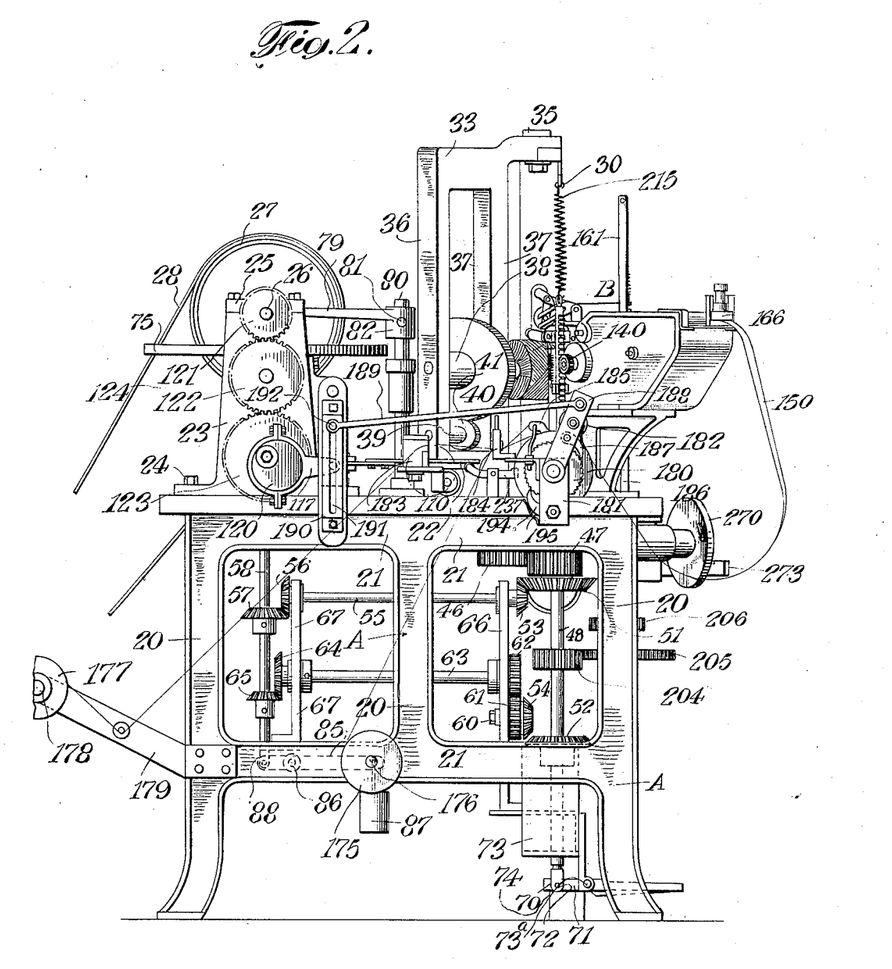
Fig. 2 is a side elevation.
Figure 3:
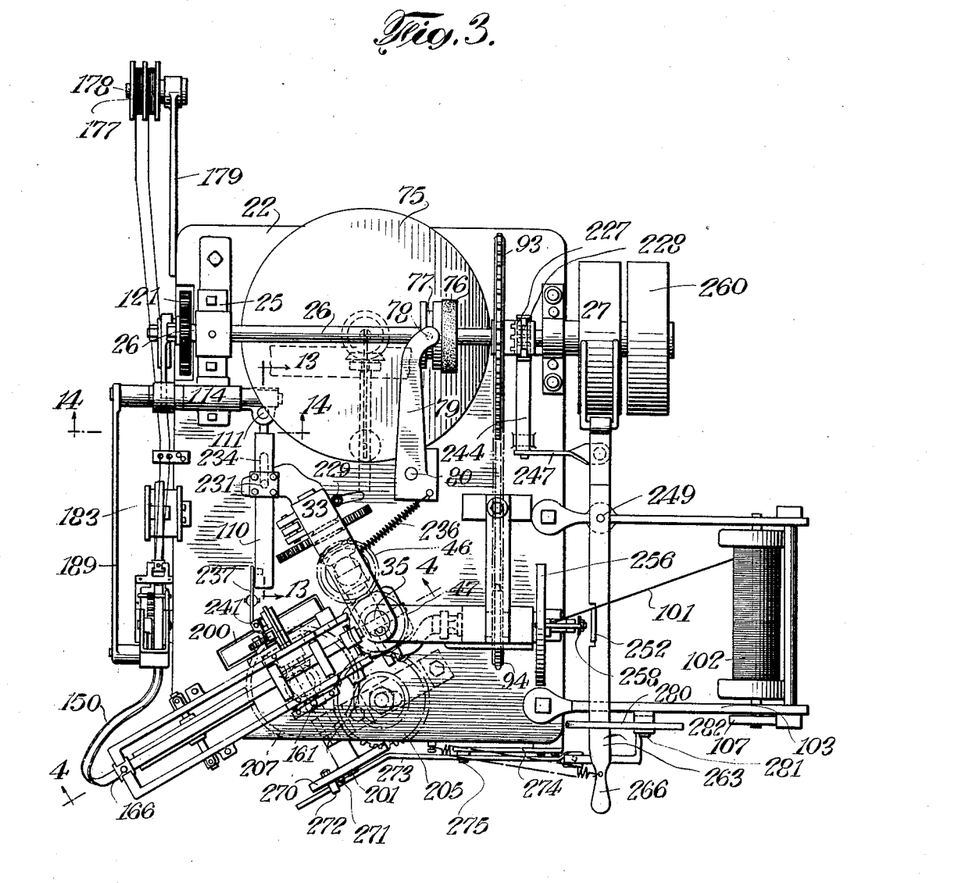
Fig. 3 is a top plan view.

Taking the parts in the positions in which they are shown in assembly Figures 1, 2 and 3 it is seen that the ball of twine B on the mandrel 38 is in practically its completed form. The rack bar 138 is in its highest position and the fingers 138b at the lower end of the rack bar 138 are positioned near the end of the concentric portions 199a of the cam grooves 199. The leading end of the tape 150 is positioned at the shears 216, 217. The mandrel 38, the flyer 90 and the mandrel frame 33 are all connected with the drive shaft 26 for operation thereby.

When the cam disc 200 rotates a short way from the position shown in these figures, the fingers on the rack bar will ride into the inwardly inclined portions 199b of the cam grooves 199 to move the rack bar downward and this movement of the rack bar through its connection with the rolls 136 and 137 will cause the tape to be fed to the surface of the ball of twine beneath the presser roll 157, the latter being pressed down by the action of cam 197 upon the push rod 161. When the rack bar has moved downward through a distance sufficient to cause the end of the tape 150 to reach the roll 157 the rigid bar 241 on the rack bar will engage the end 240 of the rocking lever 237 to raise the bar 110 from engagement with the stud 231 connected to the mandrel frame 33 and the oscillation of the frame will thereby be stopped. The spring 236 attached to the mandrel frame 33 causes it when freed to come to rest at the proper position as regulated by the adjustable stop 229 for application of the tape of the ball.

Figure 15:
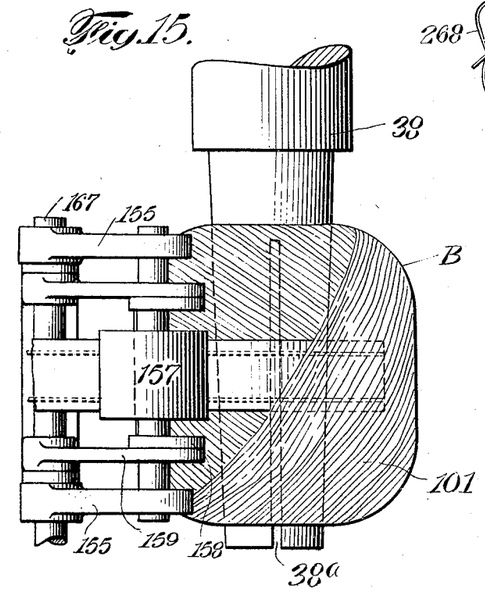
Fig. 15 is a plan view of a winding spindle and related parts showing the manner of starting a band thereon.
Figure 17:
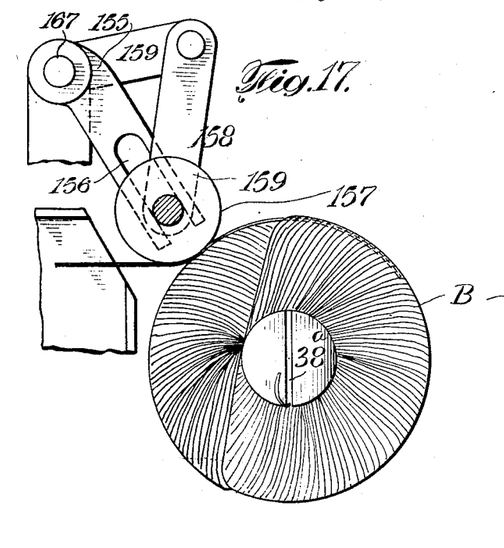
Fig. 17 is an end elevation of parts shown in Fig. 15.

The flyer 90 continues in operation for a short time after the tape is fed to the ball in order to lay a number of turns of twine upon the leading end of the tape to make the same fast upon the ball. When a sufficient number of these turns have been placed the lever 248 will be shifted by spring 288 after the latch 280 has been caused to release the lever through the action of pin 271 on cam lever 273 to cause the clutch 227 to be disengaged from the sprocket wheel 93 and to spring the detent 254 into the notch 255 in disc 256 on the flyer shaft 91 to stop the same immediately and in a determined position. The ball at this stage is shown in Figs. 15 and 17.

The mandrel 38 continues to rotate after the movement of the mandrel frame 33 and the flyer 90 have been stopped to carry the tape about the circumference of the ball. When a sufficient length of tape has been fed forward by the rolls 136, 137, the fingers 138b of the rack bar 139 will pass into the radial portion 199c of the cam groove 199 and, through the action of spring 215, the rack bar will be moved suddenly upward. The sudden upward movement of the rack bar will cause the movable blade 216 of the shears to be swung upward past the blade 217 to sever the tape.

Figure 18:
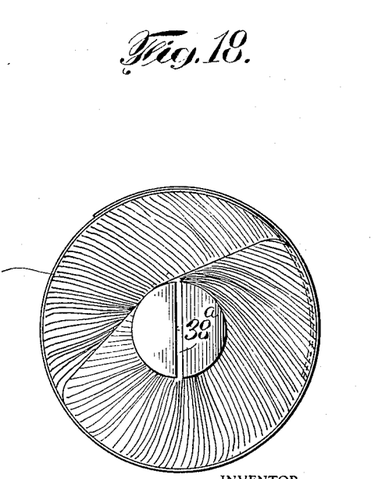
Fig. 18 is an end elevation of parts shown in Fig. 16.

When the tape has been wound completely about and secured upon the ball, action of pin 272 on lever 273 will cause the latch 280 to release the lever 263 which, through the action of spring 289 will be thrown to the left as viewed in Fig. 12, to shift the belt 28 to the idler pulley 260 to stop the machine entirely. When the machine has been stopped, the completed ball is removed from the mandrel 38 and the trailing end of the twine is cut from that portion carried by the flyer. If desired, a loop 268 may be formed in this loose end of the twine. This provides ready means for supporting the ball in use and a strong one since the loose end cannot easily cut through the reinforced band. Furthermore it suggests to the consumer that the inner end of twine, which is conveniently placed across the cavity of the ball at the end from which it may be pulled to remove the twine without twisting, should be pulled out for use. The ball of twine manufactured according to this mode of operation is shown in this completed stage in Figs. 16 and 18.

Figure 16:
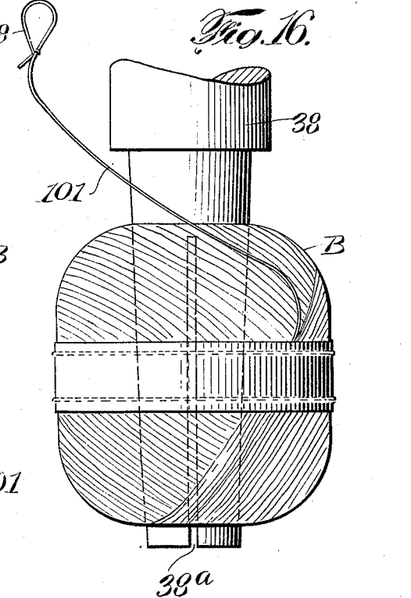
Fig. 16 is a plan view of the spindle and ball after the band has been completely applied.

To start the entire machine in operation it is only necessary to catch the end of the twine in a slot 38a and to shift the handle 250 of the lever 248 to the right. The movement of lever 248 alone will cause the lever 244 to move the clutch 227 into driving relation with the sprocket wheel 93 and permit the detent 254 to be released from the projecting member 252 so that it may move out of the notch 255 through the action of spring 259. This movement of the lever 248 through the projecting member 252 will cause coincidental movement of the belt shift lever 263 to throw the belt upon the drive pulley 27. Upward movement of the rack bar 138 will have meanwhile released the bar 110 from the lever 237 so that it will again engage the stud 231 to cause oscillation of the frame 33. The slot 38a as seen in Figs. 15 and 16 is made sufficiently long to allow the inner end of the twine to be started at the position which is to be the inner end of the ball from which end, as pointed out above, it may most advantageously be removed without causing kinking of the twine when the ball is unwound.

The mechanism for forming the tape will operate continuously at all times while the shaft 26 is turning and the tape finished by this mechanism and passed from the roll 180 will form slack between the roll and the guide 166 at the end of the tape feed box 131 where it may be pulled up and fed to the ball as required.

The parts when stopped in the positions indicated upon the completion of a ball of twine will be in proper position to start into operation again so that the related movement of the flyer and the oscillating frame 33 will be in step. But if it should happen that the parts do not start into operation in correct relationship the machine may be stopped, the detent lever 254 pushed out of the notch 255 against the spring arm 258 by the operator, and the flyer 90 turned by the knob 98 into correct position with relation to the oscillated position of the mandrel 38.

While one embodiment of this invention has been described particularly, it is to be understood that various changes and modifications are contemplated and it is therefore desired that the invention be regarded as limited only by the prior art and the scope of the appended claims.

What I claim is:

1. In a twine balling machine in combination, means to wind the twine in a ball, and means co-operable with said winding means to apply a circumferential gummed band to the surface of the ball including means to press said band upon the outer layer of twine to cause it to adhere thereto throughout its length.

2. In a twine balling machine in combination, means to wind the twine in a ball, and means co-operable with said winding means to place an end of a circumferential band beneath the outer layer of twine and wrap the band upon itself and said outer layer of twine.

3. In a twine balling machine in combination, means to lay the twine in a ball about a rotating spindle, means to rotate the spindle and means to stop the twine laying means and apply a band to the surface of the ball during the continued rotation of the spindle.

4. In a twine balling machine having means to lay the twine in a ball about a rotating spindle, the combination therewith of means co-operable with said twine-laying means to place one end of a circumferential band beneath the outer layer of twine, and means to stop the twine laying means while the band is carried completely about the ball during the continued rotation of the spindle.

5. In a twine balling machine having a ball holding spindle and means to wind the twine in a ball upon the spindle comprising twine-laying means and spindle-rotating means, the combination therewith of means to supply the end of a circumferential band to the ball while the final turns of twine are being applied so that said end will be secured beneath said twine, and means for stopping the application of twine by said twine-laying means but permitting the continued rotation of said spindle, said band supplying means thereafter being operative in co-ordination with the rotation of said spindle to wrap the band about the circumference of the completed ball.

6. In a twine balling machine having a rotatable ball-holding spindle and means to lay the twine upon the rotating spindle, the combination therewith of means to supply the end of a circumferential band to the ball while the final turns of twine are being applied so that said end will be secured beneath said twine, and means for stopping said twine-laying means, said band applying means thereafter in cooperation with the continued rotation of said spindle being operative to wrap the band about the circumference of the completed ball.

7. In a twine balling machine having a rotatable and oscillatable ball-holding spindle and means to lay the twine upon the rotating and oscillating spindle, the combination therewith of means to supply the end of a circumferential band to the ball and simultaneously to stop the oscillations of said spindle while the final turns of twine are being applied so that said end will be secured beneath said twine, and means for stopping said twine-laying means, said band supplying means thereafter in cooperation with the continued rotation of said spindle being operative to wrap the band about the circumference of the completed ball.

8. The combination with a twine balling machine having a ball-holding spindle, means to rotate said spindle, means to oscillate said spindle and a flyer to lay the twine upon the spindle, of means to supply the end of a circumferential band to the ball and simultaneously to render said spindle oscillating means inoperative while the flyer and spindle rotating means continue in operation so that said end will be secured beneath the final turns of said twine, and means for stopping the operation of said flyer, said band supplying means thereafter in cooperation with the rotation of said spindle being operative to wrap the band about the circumference of the completed ball.

9. The combination with a twine balling machine having a rotatble ball-carrying spindle and a flyer to wind the twine upon the spindle, of a clutch for connecting said flyer to a driving shaft, a stop for said flyer, a lever arranged to operate both said clutch and said stop, and means controlled by operation of the machine for moving said lever, said means comprising a rotatable cam, a lever operated by said cam, and a latch engageable with said clutch lever and releasable therefrom by movement of said cam operated lever.

10. The combination with a twine balling machine having a rotatable ball-carrying spindle and a flyer to wind the twine upon the spindle, of a clutch for connecting said flyer to a driving shaft, a shaft upon which said flyer is mounted, a notched disc on said shaft, a detent adapted to engage the notch in said disc to stop it, a spring arm provided on said detent, a pin on said spring arm and a lever arranged to operate both said clutch and said spring arm, said lever having a plate for actuating said pin.

11. The combination with a twine balling machine having a rotatable ball-carrying spindle and a flyer to wind the twine upon the spindle, of a clutch for connecting said flyer to a driving shaft, a shaft upon which said flyer is mounted, a notched disc on said shaft, a detent adapted to engage the notch in said disc to stop it, a lever arranged to operate both said clutch and said detent, a member on said clutch lever through which it acts upon said detent, and a belt shift lever mounted adjacent said clutch lever arranged to operate independently to shift the belt to stop the machine but operated by said clutch lever member to shift the belt to start the machine.

12. The combination with a twine balling machine having a rotatable ball-carrying spindle and a flyer to wind the twine upon the spindle, of a clutch for connecting said flyer to a driving shaft, a lever arranged to operate said clutch, a belt shift lever mounted adjacent said clutch lever, and means timed with the operation of said machine for controlling the movement of said clutch and belt shift levers.

13. The combination with a twine balling machine having a rotatable ball-carrying spindle and a flyer to wind the twine upon the spindle, of a clutch for connecting said flyer to a driving shaft, a lever arranged to operate said clutch, a belt shift lever mounted adjacent said clutch lever, and means timed with the operation of said machine for successively controlling the movement of said clutch and belt shift levers.

14. The combination in a twine balling machine of a rotatable ball-carrying spindle, a frame for said spindle, means to oscillate said frame, and means both to stop the oscillation of said frame and to supply tape to form a circumferential band about said ball.

15. The combination with a twine balling machine having a ball-carrying spindle, and an oscillatable frame for said spindle, of means including a roll movable toward and from said ball to supply tape for a circumferential band about said ball, and means controlled by movement of said machine for moving said roll toward the ball.

16. The combination with a twine balling machine having a ball-carrying spindle, and an oscillatable frame for said spindle, of means including a roll movable toward and from said ball to supply tape for a circumferential band about said ball, means to stop the oscillation of said frame, and means controlled by movement of said machine for moving said roll toward the ball after the oscillation of said frame has been stopped.

17. The combination with a twine balling machine having a ball-carrying spindle, and an oscillatable frame for said spindle, of means including a roll movable toward and from said ball to supply tape for a circumferential band about said ball, means to stop the oscillation of said frame, and means controlled by movement of said machine for moving said roll toward the ball after the oscillation of said frame has been stopped, said means for moving said roll including a cam driven by said machine and a rod connected with said roll and operated by said cam.

18. The combination with a twine balling machine having a ball-carrying spindle, a frame for said spindle and means to oscillate said frame, of a reciprocating bar under control of a constantly driven cam both to stop the oscillation of said frame and to supply tape for a circumferential band about said ball when moving in one direction and to cause said tape to be cut when moving in the opposite direction.

19. The combination with a twine balling machine having a ball-carrying spindle, a frame for said spindle and means to oscillate said frame, of a roll for feeding tape for a circumferential band about said ball, a rack bar, a pinion meshing with the teeth on said rack bar, ratchet connections between said pinion and said roll for operating the latter when the bar is moving in one direction, connections between said bar and said oscillating means to stop the operation of the latter when the bar moves in the direction to feed the band, a constantly driven cam in operative engagement with said bar, said cam having a concentric portion to hold said bar in one position while said ball is being formed, an inclined portion to move the bar in feeding direction and an approximately radial portion to allow the bar to move rapidly in the reverse direction, and a knife operated by said bar when moving along the radial portion of the cam to cut the band.

20. The combination with a twine balling machine having a rotatable ball-carrying spindle, a frame for said spindle and means to oscillate said frame, of a roll for feeding tape for a circumferential band about said ball, a rack bar, connections between said bar and said roll for operating the latter when the bar is moving in one direction, connections between said bar and said oscillating means to stop the operation of the latter when the bar moves in the band feeding direction, a constantly driven cam having a concentric portion to hold said bar in one position while said ball is being formed, an inclined portion to move the bar in feeding direction, and an approximately radial portion to allow the bar to move rapidly in reverse direction, and a knife operated by said bar when moving along the radial portion of said cam to sever the band after a sufficient length thereof has been fed to form a circumferential band for said ball.

21. The combination with a twine balling machine having a rotatable ball-carrying spindle and an oscillatable frame for said spindle, of a reciprocating bar having a breakable driving connection with said frame, and means to break said connection and stop the oscillation of said frame.

22. The combination with a twine balling machine having a rotatable ball-carrying spindle and an oscillatable frame for said spindle, of a reciprocating bar having a pin and recess driving connection with said frame, and means controlled by movement derived from said machine to break said connection and stop the oscillation of said frame when a ball is completed.

23. In a ball winding machine in combination, means to wind a ball of twine, means to supply a cover tape to said ball including a rack bar, a pivoted knife member for cutting said tape, a projection on said member, and a push rod pivoted on said rack bar having a lug with an abrupt face and a more gradually inclined face, said inclined face passing by the projection on said knife member when the rack bar is moving in one direction but said abrupt face engaging the projection to move the knife member when the bar is moving in the reverse direction.

24. The combination as set forth in claim 23 but which further includes resilient connections between said rack bar and push rod to bias the lug of the rod toward the projection and to allow said abrupt face to be disengaged from the projection after the knife member has been moved the required distance.

25. The combination as set forth in claim 23 but which further includes a spring for moving said rack bar abruptly in the direction for said abrupt lug face to engage said projection.

26. In a twine balling machine in combination, means to form twine into a ball, means to apply a reinforced band lengthwise to the circumferential surface of the ball, and means to form said band, said band-forming means being co-ordinated in action with said ball-forming means and said band-applying means to furnish the band as it is required after the winding of the twine on the ball has been substantially completed.

27. In a twine balling machine in combination, means to form twine into a ball, means to apply a longitudinally reinforced band to the ball, means to form said longitudinally reinforced band, said band-forming means being co-ordinated in action with said ball-forming means and said band-applying means to furnish the band as it is required after the winding of the twine on the ball has been substantially completed, and means to regulate the action of said band-forming means.

28. The method of manufacturing a ball of twine which comprises, rotating and oscillating the ball while wrapping the twine thereabout, stopping the oscillation of the ball while permitting the rotation and wrapping to continue and simultaneously supplying a circumferential band thereto, then stopping the wrapping after a number of turns of twine have been carried across the end of the band while permitting the rotation to continue until the band is completely passed around the ball and secured upon itself.

29. The method of manufacturing a ball of twine which comprises, rotating the ball while wrapping the twine thereabout, stopping the wrapping and supplying a flat circumferential band thereto from a source other than that from which the twine is supplied while permitting the rotation to continue until the band is completely passed around the ball and secured upon itself.

30. The method of manufacturing a ball of twine which comprises, rotating the ball while wrapping the twine thereabout, stopping the wrapping and pressing a gummed circumferential band thereto while permitting the rotation to continue until the band is completely passed around the ball and stuck to the surface turns of twine and upon itself.

31. In a twine packaging machine, in combination, means for rotating a ball of twine, means for feeding a band thereto, means holding said ball in position to receive said band about its circumference, and means for pressing said band upon the ball.

In testimony whereof, I have signed my name to this specification this 25th day of October, 1927.

HERBERT A. CORBETT.